United States Patent
Hurst (10) Patent No.: US 6,203,722 B1
(45) Date of Patent: Mar. 20, 2001

(54) STABILIZED LIQUID LIME DISPERSION FOR SEWAGE TREATMENT

(75) Inventor: Louis S. Hurst, Ashland, OH (US)

(73) Assignee: New Eezy Gro, Inc., Carey, OH (US)

( * ) Notice: Subject to any disclaimer, the term of this patent is extended or adjusted under 35 U.S.C. 154(b) by 0 days.

(21) Appl. No.: 09/176,852

(22) Filed: Oct. 2, 1998

Related U.S. Application Data (62) Division of application No. 08/959,564, filed on Oct. 28, 1997, now Pat. No. 6,036,881.

(51) Int. Cl.$^7$ ................................. C09K 3/00; B01F 3/12
(52) U.S. Cl. ........................... 252/192; 252/189; 252/175; 252/176; 252/179; 516/88
(58) Field of Search ..................... 252/192, 175, 252/176, 179, 189; 423/640; 516/88; 106/792, 800; 71/64.08, 901; 210/705; 424/694

(56) References Cited

U.S. PATENT DOCUMENTS

| | | | |
|---|---|---|---|
| 3,607,738 | 9/1971 | Nelson | 210/728 |
| 3,635,817 | 1/1972 | Zuckerman et al. | 210/667 |
| 3,826,365 | 7/1974 | Mercade | 209/5 |
| 4,005,546 | 2/1977 | Oswald | 47/1.4 |
| 4,012,354 | 3/1977 | Paul | 524/376 |
| 4,033,893 * | 7/1977 | Mondshine | 507/107 |
| 4,108,768 | 8/1978 | Sebelik et al. | 210/705 |
| 4,110,211 | 8/1978 | Henrikson | 210/716 |
| 4,123,426 * | 10/1978 | Katayama et al. | 252/3 |
| 4,208,283 | 6/1980 | Brouzes | 210/754 |
| 4,282,059 | 8/1981 | Davidson | 162/158 |
| 4,415,467 | 11/1983 | Piepho | 252/181 |
| 4,472,370 * | 9/1984 | Miyata et al. | 423/639 |
| 4,610,801 * | 9/1986 | Matthews et al. | 252/175 |
| 4,631,132 | 12/1986 | Jones | 210/727 |
| 4,849,128 | 7/1989 | Timmons et al. | 252/181 |
| 5,018,457 * | 5/1991 | Brady et al. | 110/346 |
| 5,047,153 * | 9/1991 | Nowak et al. | 210/153 |
| 5,186,840 | 2/1993 | Christy et al. | 210/709 |
| 5,422,015 * | 6/1995 | Angell et al. | 588/257 |
| 5,512,265 * | 4/1996 | Funahashi et al. | 423/640 |
| 5,593,625 | 1/1997 | Reibel | 264/115 |
| 5,616,283 * | 4/1997 | Huege et al. | 252/192 |
| 5,620,774 * | 4/1997 | Huege et al. | 427/236 |
| 6,036,881 * | 3/2000 | Hurst | 252/192 |

OTHER PUBLICATIONS

G. R. Gray et al., "Composition and Properties of Oil Well Drilling Fluids Forth Edition" (Gulf Publishing Company, Houston, TX copyright 1980) pp. 576–577 and 602–603 Oct. 1980.*

* cited by examiner

Primary Examiner—Richard D. Lovering
Assistant Examiner—Daniel S. Metzmaier
(74) Attorney, Agent, or Firm—Frank H. Foster; Kremblas, Foster, Millard & Pollick (57) ABSTRACT

A stabilized lime slurry for treatment of biological solids in sewage. The composition preferably includes 30–36% calcium hydroxide, 10–16% potassium hydroxide, 2–4% potassium chloride, 2–4% magnesium hydroxide, all on a dry basis, and the balance in water. This composition raises the pH rapidly for destroying pathogens, is sufficiently concentrated for economically feasible transportation, and reduces the cost, difficulties and dangers of treating sewage with a lime based composition while providing a resulting product from the sewage treatment process which can be spread upon agricultural soil in a manner which improves soil fertility without introducing undesirable or contaminating materials into the soil.

11 Claims, 5 Drawing Sheets

STABILIZED LIQUID LIME DISPERSION FOR SEWAGE TREATMENT

This application is a divisional application of application Ser. No. 08/959,564, filed Oct. 28, 1997, now U.S. Pat. No. 6,036,881 issued Mar. 14, 2000.

BACKGROUND OF THE INVENTION

Field of the Invention

This invention relates generally to waste treatment, and more particularly relates to a composition for the treatment of sewage containing biological solids. The composition reduces the difficulties and dangers of handling the treatment material, more rapidly becomes highly active thereby improving the capacity of the treatment facility and provides a resulting liquid or solid product of the treatment process which is suitable for application to soil used for agricultural purposes.

Description of the Related Art

The prior art discloses a wealth of materials and processes for treating waste, such as waste water and sewage. Alkaline materials, including lime, have been used for treating the biological solids in municipal and industrial waste water treatment plants. Such treatments are shown, for example, in U.S. Pat. Nos. 5,186,840 and 4,415,467. High alkalinity destroys potentially harmful pathogenic microbes by raising the pH of the host material to a level at which the microbes cannot survive. Federal regulations require that biosolid materials be brought to and held at a pH level of 12 for at least 2 hours and at a pH level of 11 for an additional period of at least 22 hours to assure the destruction of the pathogens.

Although the prior art teaches treating waste water with lime, there are problems associated with the prior art methods and compositions used for such treatments. The problems are a combination of:

(1) the difficulty of mixing the lime into the sewage and the cost for equipment to assist in the mixing;
(2) the dangers to human health and property from the use of dry particulate lime;
(3) the slow speed of the activation of the lime in raising the pH and destroying the pathogens after it is applied, which results in a slow down of the treatment process and therefore reduces the capacity of the treatment facility; and
(4) the inclusion of materials in the treated biological, solid products of the sewage treatment process which are not suitable for application to soil used for agricultural purposes.

Conventionally, dry quicklime, CaO, or hydrated lime, $Ca(OH)_2$, also known as slaked lime, is delivered to a waste treatment plant in bulk or in bags, or similar containers. The lime is dumped into the biosolids treatment tanks, which results in a large proportion of the lime sinking to the bottom as a mass which tends to stick together and is difficult to break up. Attempts to break it up are both difficult and time consuming with dispersement of the lime being non-homogeneous and incomplete. Because of the difficulty of dispersing lime under such conditions, the throughput capacity of the sewage treatment plant is reduced.

One approach to solving this problem is to install new, additional equipment to speed up the dispersion of the lime and more rapidly initiate the activity of the lime. This, however, requires a major, capital investment. An example is found in U.S. Pat. No. 4,110,211. As a consequence, it is costly to achieve the above pH levels required by federal regulation.

Additionally, dry lime is a caustic material and readily disperses into the air, making it both messy and dangerous to handle and irritating to workers. Workers may breathe in the lime or get it on their skin, in their eyes or on their clothing, creating a potential for causing discomfort, injury or illness. In windy weather conditions, the lime particles may also be carried onto neighboring areas, creating a potential for damage to property and the environment.

The prior art has recognized that it would be desirable to supply lime to a sewage treatment facility by means of a tanker in the form of an aqueous suspension (a slurry) in order to make the lime easier and safer to handle and to apply into the treatment process. However, lime which is mixed in water settles and agglomerates as deposits at the bottom of the container, and therefore requires continued or periodic stirring or agitation to keep it suspended and dispersed. This requires an investment in additional equipment to maintain the suspension during storage and transportation, although it eliminates the need for an investment in equipment at the treatment facility.

Such an aqueous suspension based lime delivery system also requires that the suspension contain a sufficiently high proportion of lime to make the transportation of the slurry economically cost effective. Otherwise, this technique bears the cost of transporting excessive amounts of water.

However, it is believed also desirable to be able to apply the treated biological particulates resulting from sewage treatment to agricultural soils because doing so would both make available an inexpensive source of organic materials, while providing for the inexpensive, non-polluting disposal of the solid products of the sewage treatment facility. Unfortunately, however, prior lime slurries contain materials which are added to maintain the lime in suspension, but are harmful or of no benefit to the soil agronomy. Such undesirable materials include metals, such as sodium, or other inorganic materials which form harmful inorganic salts, and also organic compounds having unknown consequences to plant and animal life. Such a material is disclosed in U.S. Pat. No. 4,849,128.

It is therefore an object and purpose of the present invention to provide a material which not only provides a stable lime slurry which is easily and conveniently handled, stored and applied to the sewage treatment process, but also is economically cost effective and, most importantly, results in a product which is agriculturally and environmentally friendly when applied or spread upon agricultural land as a fertilizer.

It is an object and feature of the invention to use materials in the lime treatment composition which are both effective in maintaining a sufficiently stable and concentrated lime slurry so as to be economically feasible, while also contributing to the nutrient condition of soil so that application of the products of the sewage treatment facility to soil for agricultural purposes becomes safe, legally permissible and desirable.

It is a further object and feature of the invention to provide a material which eliminates the need for investment in the installation of additional equipment in sewage treatment facilities by providing a lime slurry composition, which requires only that it simply be pumped into existing sewage treatment lagoons and blended with modest agitation.

SUMMARY OF THE INVENTION

The composition of the present invention is a stabilized slurry formed by a colloidal dispersion of lime in a water and potassium hydroxide solution. Preferably, the slurry also includes potassium chloride for improving flowability and magnesium hydroxide for maintaining soil balance. This composition remains suspended indefinitely without the need for agitation, mixing or stirring, can be sufficiently concentrated that it can be transported in effective amounts at a reasonable cost and can be handled efficiently and effectively without leaving deposits in transport or storage tanks or causing injury or discomfort to workers at the sewage treatment facility. This material also permits the biological products of the sewage treatment to be applied to fields and make a beneficial contribution to soil agronomy. The preferred composition is hydrated lime in an amount substantially in the range of 20%–40% on a dry weight basis, potassium hydroxide in an amount substantially in the range of 5%–18% on a dry weight basis, and 42% to 75% water by weight. The preferred composition also includes potassium chloride in an amount substantially in the range of 0%–10% on a dry weight basis and magnesium hydroxide in an amount substantially in the range of 0%–10% on a dry weight basis.

In describing the preferred embodiment of the invention, specific terminology will be resorted to for the sake of clarity. However, it is not intended that the invention be limited to the specific terms so selected and it is to be understood that each specific term includes all technical equivalents which operate in a similar manner to accomplish a similar purpose.

DESCRIPTION OF THE PREFERRED EMBODIMENT

The principal component of the present invention is hydrated (slaked) lime in a range of 20%–40% on a dry weight basis of the completed composition. The lime may be introduced into the water in its hydrated form or, alternatively, quicklime, CaO, may be added to the water and hydrated in the mixture during stirring. An additional portion of water is needed for in situ slaking of quicklime to the hydrated calcium hydroxide form.

The lime is highly alkaline and therefore provides a substantial quantity of OH– ions for the anti-pathogen activity. Preferably common commercial lime is used, having a density of 20–30 lbs/cubic foot, with particles having a size for which 98% pass through a 200 mesh screen and 92% pass through a 325 mesh screen. The completed composition should include hydrated lime in an amount substantially in the range of 20%–40% on dry weight basis. Less than this range has been found to not be sufficiently effective and too expensive to economically transport in effective quantities because of the cost of transporting excess water. Quantities exceeding this range have been found to deteriorate the flowability of the product and cause settling of the dispersion. Preferably, the hydrated lime is 30%–36% of the composition, and most preferably 32%–34% of the composition. The hydrated lime not only provides the OH⁻ ions for raising the alkalinity of the treated sewage in order to destroy microbes, but additionally the calcium remaining in the treated sewage provides a soil nutrient when applied to agricultural fields.

The second important component of the composition of the present invention is potassium hydroxide, KOH, in an amount substantially in the range of 5%–18% on a dry weight basis. Although it is preferred to introduce the KOH as a 45% aqueous solution when formulating the composition of the present invention, the proportions in the composition are described on a dry or solid basis for purposes of consistency and clarity. Consequently, the water in a KOH solution becomes a portion of the water component of the stabilized lime slurry of the invention. The quantity of KOH used is considerably larger than the quantity of alkali metal hydroxide used in prior art material. The KOH simultaneously accomplishes three purposes: (1) it assists in dispersing the lime and in maintaining the colloidal dispersion at a higher concentration; (2) it is a strong alkalizing agent which is very water soluble and therefore provides a rapid acting bacterial kill, immediately attacking the bacteria in the sewage sludge; and (3) it supplies a significant amount of potash to the soil, which is an important agricultural fertilizer component. The potassium hydroxide provides a higher density material to assist in supporting the heavy, undissolved lime particles in suspension which assists in maintaining the colloidal dispersion at a high concentration, thereby preventing agglomeration, while at the same time contributing to alkalinity and consequent bacterial action.

The potassium hydroxide is included in the composition in an amount substantially in the range of 5%–18% on a dry weight basis, and preferably in an amount of 10%–16%, and most preferably in an amount of 12%–14%. A minimum of at least 5% is needed in order for the above activity to be significant. Quantities exceeding this range are so excessively expensive that the product becomes economically not feasible or practical.

Water should make up 40% to 75% by weight of the composition. Quantities of water exceeding this rate provide no additional utility and only increase the cost of transporting and delivering the product. Quantities below this range cause the composition to become too thick and viscous, and therefore too difficult and impractical to handle and pump. Preferably the water is 48% to 56% of the composition, and most preferably 48% to 52%.

An additional, important ingredient is potassium chloride, KCl, in an amount exceeding 0% and substantially in the range of 0%–10% on a dry weight basis. Preferably the KCl is substantially in the range of 2%–4%, and most preferably is used in an amount of 2%. The KCl reduces the viscosity of the slurry composition of the invention to counteract the increase in the viscosity resulting from hydration of the lime and the introduction of the other particulate materials into the composition. The viscosity is reduced in order to maintain the ability of the composition to be mixed and to flow through pumping equipment. If the composition reaches an excessive viscosity, problems arise in manufacturing the composition, particularly in mixing, and additionally the product becomes difficult to pump to and from transportation and storage tanks and into the treatment tanks. The KCl helps maintain a higher concentration of lime and also reduces or eliminates the build up of deposits on the transportation and storage tanks. The use of quantities exceeding substantially 10% of the composition provides no additional increase in its effectiveness, thus needlessly increasing cost.

It has also been found desirable to include magnesium hydroxide, $Mg(OH)_2$, in an amount substantially in the range of 0%–10% on a dry weight basis. Preferably, the magnesium hydroxide is included in the composition in an amount substantially in the range of 2%–4%, and most preferably in an amount of 2%. The magnesium hydroxide is preferably prepared by mixing magnesium oxide, MgO, into the water, but formulations are given in terms of a dry weight basis of magnesium hydroxide for purposes of consistency. Consequently, it is preferable to provide some additional water for hydrating the MgO in situ, as described above for the lime.

The magnesium hydroxide is not very water soluble and therefore does not contribute much to the alkalinity of the composition. Its principal purpose is to assist in maintaining the proper soil balance of magnesium and calcium for good agronomy practice. In a soil, it is desired to have a ratio of magnesium to calcium on the order of 1:5 to 1:7. Therefore, the quantity of magnesium hydroxide included in the composition is somewhat dependent upon the magnesium soil content in the soil where the finished, treated sewage product is expected to be spread. Since most soils have sufficient magnesium, it is desirable to apply just enough magnesium to maintain the proper balance. Some soils are high in magnesium and, for such soils, it is preferable to include less magnesium hydroxide and maintain a ratio of magnesium to calcium in the stabilized lime slurry composition of the invention on the order of 1:10.

Polyvinyl alcohol in an amount on the order of 1% has also been added to the composition in order to improve the suspension by increasing the density of the liquid in order that it better support suspended particles. A polyelectrolyte might also be added for a similar purpose. Generally, neither is needed unless the water content exceeds 58%.

Experimentation has demonstrated that preparation of a stabilized lime slurry composition in accordance with the present invention is facilitated by first combining all of the water and potassium hydroxide in a receptacle to form an aqueous solution. The calcium hydroxide, potassium chloride, and magnesium hydroxide are then introduced into this solution in a plurality of spaced stages which are separated by a time interval of stirring. There should be at least two stages, preferably three, and four such stages are also useful. The number of stages is dependent upon the quantity, type and effectiveness of the agitation which is available to effect homogeneous mixing. Less effective agitation requires more stages. At each stage a portion of each of these three constituents are inserted with the potassium chloride being added to the mixture, no earlier than simultaneously with the calcium hydroxide and preferably subsequent to it. In this manner, potassium chloride's effect of reducing viscosity to counteract the increase in viscosity resulting from introduction of the lime is best realized to facilitate the ongoing stirring of the mixture and assist the dispersion of the lime. The calcium hydroxide, potassium chloride and magnesium hydroxide may be introduced in equal amounts in each stage, although variations from this equality are also effective. Experience has also indicated that preferably the stirring between the stages in which these three constituents are introduced occur for an interval of at least about 10 minutes.

For example, a composition in accordance with the present invention was manufactured using the components in the following Table 1.

TABLE 1

| Material | Weight In Pounds | Percent of Total |
| --- | --- | --- |
| Calcium Hydroxide | 378 | 32.30 |
| Potassium Hydroxide (45% solution) | 371 | 31.70 |

TABLE 1-continued

| Material | Weight In Pounds | Percent of Total |
| --- | --- | --- |
| Water | 363 | 31.0 |
| Magnesium Oxide | 23.4 | 2.0 |
| Potassium Chloride | 23.4 | 2.0 |
| Polyvinyl Alcohol | 11.7 | 1.0 |
| | 1170.5 | 100% |

The potassium hydroxide was a 45% solution, and therefore 55% of that solution represents water in addition to the water separately added and shown in the Table. All of the water, followed by all of the potassium hydroxide solution, were added to the reactor receptacle and thoroughly mixed by means of agitation. 68.0 pounds of lime (18% of total lime) was then slowly added to the above solution at an even flow rate and mixing continued until the lime was well dispersed. 7.8 pounds of potassium chloride (33% of total potassium chloride) was then mixed in with agitation and mixed thoroughly for about 10 minutes. 5.85 pounds of magnesium oxide (25% of total magnesium oxide) was then introduced under agitation and mixed thoroughly for about 10 minutes.

An additional 86.9 pounds of lime (23% of total lime) was then added to the mixture slowly at an even flow rate and while dispersed. Then 5.85 pounds of magnesium oxide (25% of total magnesium oxide) was then added under agitation and mixed thoroughly.

128.5 pounds of lime (34% of total lime) was then added to the mixture under agitation and well dispersed. 7.8 pounds of potassium chloride (33% of total potassium chloride) was then added to the above mixture and mixed for about 10 minutes. 5.85 pounds of magnesium oxide (25% of total magnesium oxide) was then added to the mixture and mixed for about 10 minutes.

94.5 pounds of lime (25% of total lime) was then added slowly at an even flow rate and mixed until well dispersed. Then, 7.8 pounds of potassium chloride (33% of total potassium chloride) was added to the mixture and mixed for about 10 minutes. 5.85 pounds of magnesium oxide (25% of total magnesium oxide) was then added to the mixture and mixing and agitation was continued until the entire product was thoroughly and completely mixed and the lime was well dispersed. Then, 11.7 pounds of polyvinyl alcohol (100% of total) was added to the mixture while mixing and agitation continued for at least 15 minutes. The product was then visually inspected for dispersement, the specific gravity, pH and calcium content were measured, and a pour point test was conducted to ensure conformity to the specification.

The resulting composition had finely divided particles of lime homogeneously dispersed and the composition, though relatively thick and viscous, nonetheless flowed readily. The material was found to remain dispersed indefinitely when kept at a temperature of 0° at or above. The above measurements revealed that the composition had a pH at 68° F. in the range of 13.5 to 14.0. A 5% solution of the composition at that temperature was found to have a pH of 13.0. The material had a specific gravity of 1.403 grams per milliliter or 11.7 pounds per U.S. gallon. Measurement of the pour point (fluidity) of the material at 0° F. revealed a fluidity exceeding 90%. The fluidity test was conducted by placing 400 milliliters of the composition in a 500 milliliter beaker, which was cooled to 0° F. in a domestic refrigerator. During the cooling period it was stirred hourly until this temperature was reached. The contents of the beaker was then poured into the second beaker by inverting the first beaker for 10 seconds. The contents of the second beaker at the end of that 10 seconds was then measured to determine the proportion of the material which had flowed into the second beaker.

Both small laboratory tests and large field tests involving 140,000 gallons of biosolids were performed on a composition embodying the present invention. The composition was pumped into the biosolids treatment tank and found to disperse quickly and completely. There were no clumps or masses of lime formed on the bottom of the holding tank. The pH of the biosolids rose rapidly and within 30 minutes reached 12.3 and then stabilized. After 24 hours the pH was well above 12. Laboratory tests show that the destruction of pathogens was effective and that, as a result, the biosolid materials qualified as Class A Sludge as defined in EPA Regulations 503. In all such tests, minimum standards for Class B Sludge were achieved and additionally, in several instances, the minimum for Class A was achieved.

In the field tests, the composition was handled in a closed system comprised of sealed storage tanks, pumps, valves, pipes and meters which permit entirely mechanized handling of the composition without requiring that it be touched or exposed to human skin. Such a closed system minimizes the danger of injury to workers and damage to property and the environment.

Three additional experiments were performed to test the effectiveness of various proportional combinations of the components of the stabilized lime slurry in accordance with the present invention. The tests performed and their results are as follows:

TABLE 2

EXPERIMENT 1. To Test Range of Composition Suitable for Making Liquid Lime Suspensions

| | % Composition | | | | | |
|---|---|---|---|---|---|---|
| Sample No. | 1 | 2 | 3 | 4 | 5 | 6 |
| Water | 52 | 50 | 48.5 | 47 | 45 | 43 |
| KOH, d.b. | 18 | 16 | 13.5 | 11 | 9 | 7 |
| $Ca(OH)_2$ | 20 | 25 | 30 | 35 | 40 | 45 |
| MgO | 10 | 8 | 6 | 4 | 2 | 0 |
| KCl | 0 | 1 | 2 | 3 | 4 | 5 |

Six 300 g samples were prepared according to the above percent compositions.

Water and dissolved KOH were placed in the mixing vessel first. The lime, magnesium oxide and KCl were added in four increments, i.e., ¼ of lime, ¼ of MgO and ¼ of KCl were added and stirred vigorously followed by a 2nd, 3rd and 4th addition each time followed by vigorous stirring. Final stirring was for 30 minutes at a mild rate. The samples were transferred to 8 oz. bottles and allowed to stand for 48 hours after which they were evaluated.

Five response factors were observed and determined for the six samples of Experiment 1.

TABLE 3

Results of EXPERIMENT 1

| Sample No. | 1 | 2 | 3 | 4 | 5 | 6 |
|---|---|---|---|---|---|---|
| Settling Of Suspension | Settled (15%) | Slight Settling | no | no | no | no |
| Flowability | Good | Good | Good | Good | Poor | Poor |

TABLE 3-continued

Results of EXPERIMENT 1

| Sample No. | 1 | 2 | 3 | 4 | 5 | 6 |
|---|---|---|---|---|---|---|
| Dispersion* | Good | Good | Good | Good | Poor | Poor |
| pH Adjust* | Good | Good | Good | Good | Poor | Poor |
| Titration of Alkalinity, meq/g** | 12.0 | 12.2 | 12.5 | 12.8 | 13.1 | 13.3 |

*100 ml of 0.4% phosphoric acid solution was treated with liquid lime and observed
**Titration of liquid lime alkalinity with 1-N HCl EXPERIMENT 1 results of the six samples show samples 5 & 6 were somewhat too thick to handle, whereas sample 1 and perhaps sample 2 were somewhat thin for efficient storage and performance.

TABLE 4

EXPERIMENT 2. To Test Range of Water and KOH Concentration Suitable for Making Liquid Lime Suspensions

| | % Composition | | | | |
|---|---|---|---|---|---|
| Sample No. | 1 | 2 | 3 | 4 | 5 |
| Water | 42 | 44 | 46.5 | 49 | 51 |
| KOH | 18 | 16 | 13.5 | 11 | 9 |
| $Ca(OH)_2$ | 32 | 32 | 32 | 32 | 32 |
| MgO | 6 | 6 | 6 | 6 | 6 |
| KCl | 2 | 2 | 2 | 2 | 2 |

These samples were prepared similarly to those of EXPERIMENT 1 except the lime, MgO and KCl were added in three increments stirring after each of the three additions with a final stirring for 30 minutes. Samples were tested after standing 48 hours.

TABLE 5

Results of Experiment 2

| Sample No. | 1 | 2 | 3 | 4 | 5 |
|---|---|---|---|---|---|
| Flowability | Very Poor | Poor | Good | Good | Good |
| Alkalinity, meq/g. | 12.0 | 11.9 | 11.7 | 11.5 | 11.3 |

Suspension was good for all samples and dispersion was good for samples 2–5.

These results indicate that the water content is preferably 44% or higher leaving the % KOH at 16% or less when the combined lime, MgO and KCl is at 40%.

TABLE 6

EXPERIMENT 3. To Test Effect of Potassium Chloride (KCl) Concentration on Liquid Lime Suspensions

| | % Composition | | |
|---|---|---|---|
| Sample No. | 1 | 2 | 3 |
| Water | 52 | 51 | 50 |
| KOH | 14 | 13.7 | 13.4 |
| $Ca(OH)_2$ | 32 | 31.3 | 30.6 |
| MgO | 2 | 2 | 2 |
| KCl | 0 | 2 | 4 |

Samples were prepared similar to EXPERIMENT 2 with the amount of KCl being the main variable (0 to 4%). The concentration of KOH, Ca(OH)$_2$ and MgO in water was selected from previous trials that would make a good suspension.

The three samples were evaluated mainly by a pour test. The relative pour test used here was to place a weighed amount of liquid lime sample(450–260 gms) in a beaker at ambient temperature (25° C.). The beaker was inverted to a high pouring angle for 10 seconds. The amount of sample remaining in the beaker was calculated as a percent of the total sample.

TABLE 7

Results of EXPERIMENT 3

| Experiment Sample | % KCl | Pour Test % Remaining |
|---|---|---|
| 1 | 0 | 8.2 |
| 2 | 2 | 3.9 |
| 3 | 4 | 3.1 |

This test indicates that 2% KCl was effective in increasing the pourability or product transfer by a significant amount. 4% KCl was not much better than 2%. It was also noted that without KCl, the liquid lime would cling to the sides of a polyethylene or polyvinyl chloride vessel whereas Samples 2 and 3 containing the KCl released thoroughly.

TABLE 8

EXPERIMENT 4 - POTASSIUM HYDROXIDE VERSUS CALCIUM HYDROXIDE

| | % Composition | | | | | | |
|---|---|---|---|---|---|---|---|
| Sample No. | 1 | 2 | 3 | 4 | 5 | 6 | 7 |
| Water | 52 | 52 | 58 | 55 | 52 | 52 | 52 |
| KOH, d.b. | 2 | 4 | 1.7 | 3.7 | 6 | 8 | 10 |
| Ca(OH)$_2$ | 42 | 40 | 36 | 37 | 38 | 36 | 34 |
| Mg(OH)$_2$ | 2 | 2 | 1.7 | 1.8 | 2 | 2 | 2 |
| KCl | 2 | 2 | 1.7 | 1.8 | 2 | 2 | 2 |

These samples were made up and evaluated similar to Experiment 1, and the observed results were as follows:

TABLE 9

Results of EXPERIMENT 4

| Sample No. | 1 | 2 | 3 | 4 | 5 | 6 | 7 |
|---|---|---|---|---|---|---|---|
| Flowability | very poor (paste) | very poor (thick) | good | good | good | good | good |
| pH Adjustment* (minutes) | — | — | very slow (6) | slow (3) | slow (2) | fast (<1) | fast (<1) |
| Alkalinity, meq/g | — | — | 10.8 | 11.4 | 12.0 | 11.8 | 11.6 |
| Cost | | | | | | | |
| (a) ¢/gal. | — | — | 29 | 36 | 44 | 49 | 54 |
| (b) ¢/eq. | — | — | 0.51 | 0.60 | 0.70 | 0.79 | 0.88 |

*Starting with 200 ml of water adjusted to pH 2.2 with phosphoric acid to, impart, simulate the use of waste water sludge.

Table 9 shows results from making seven samples of lime suspensions in which mainly KOH and Ca(OH)$_2$ were varied. Samples 1 and 2 were so thick they were diluted with water to produce Samples 3 and 4 respectively. Low levels of KOH did not give an immediate response in the pH adjustment test using a very dilute solution of phosphoric acid, and adjusting the solution to 12.0 pH. This and other observations lead to the observation that at least 5% KOH is needed or a ratio of at least 1 part KOH to 8 parts Ca(OH)$_2$. More KOH gives even more rapid adjustment to 12.0 pH. The soluble KOH seeks out and destroys bacteria while the pH is uniformly adjusted to 12, better and more thoroughly than with Ca(OH)$_2$ suspension alone. The more KOH used, the more direct and rapid is the adjustment to 12.0 pH. However, the KOH is considerably more expensive than the lime. Therefore, the use of at least 1 part Ca(OH)$_2$ with 1 part KOH keeps the cost reasonable. A 2 to 1 ratio is better. The soluble KOH produces a denser solution, thus giving more support for keeping the lime in suspension.

The result is that the KOH should be present in the composition at least in an amount providing a KOH:Ca (OH)$_2$ ratio of 1:8 to provide sufficiently rapid adjustment of the treated sewage to 12.0 pH, but should not exceed a ratio of 1:1 and preferably 1:2 to maintain a sufficiently low cost.

Figure 1:
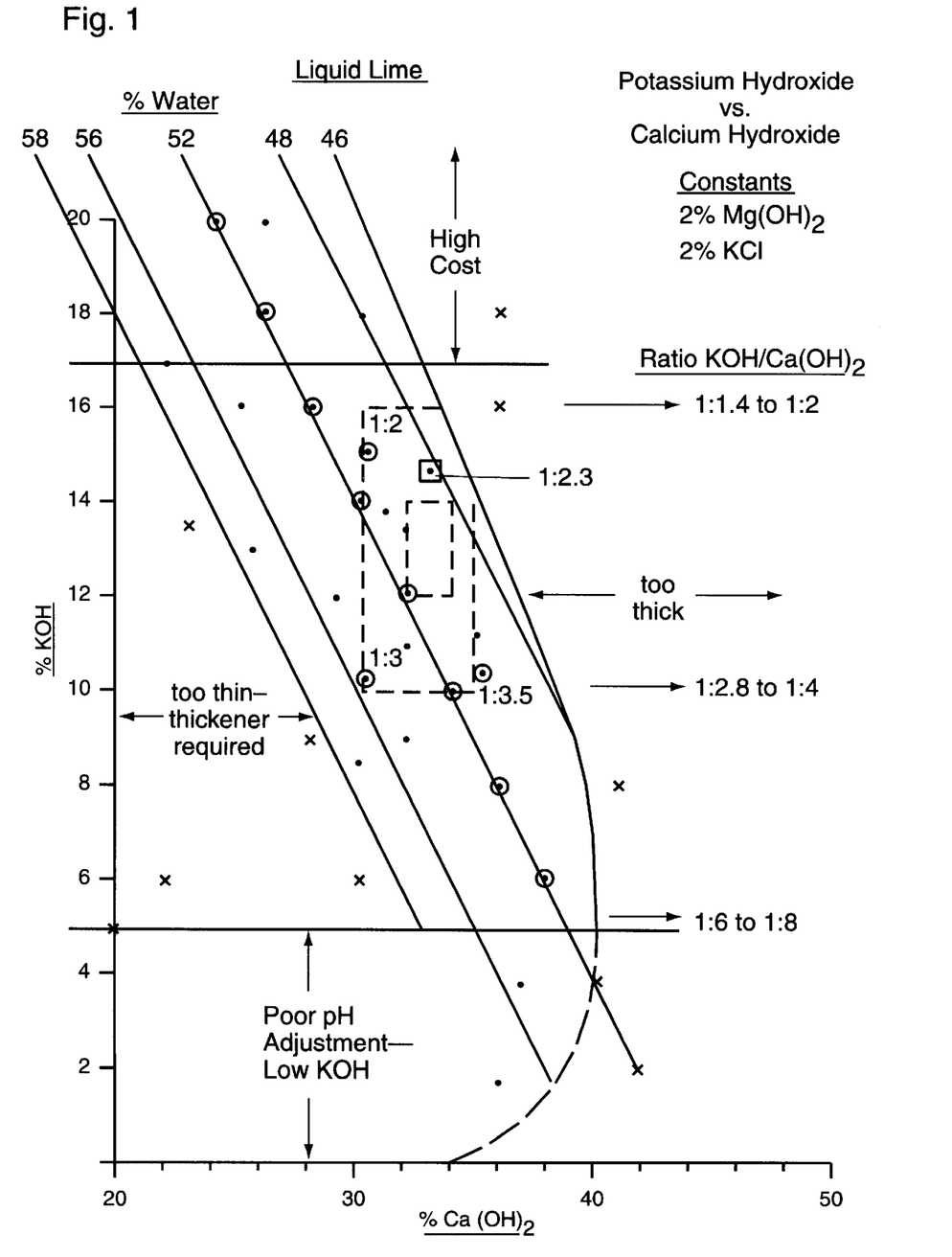
FIGS. 1, 2 and 3 are graphs illustrating the cost and performance effects from various combinations of potassium hydroxide and calcium hydroxide.
Figure 2:
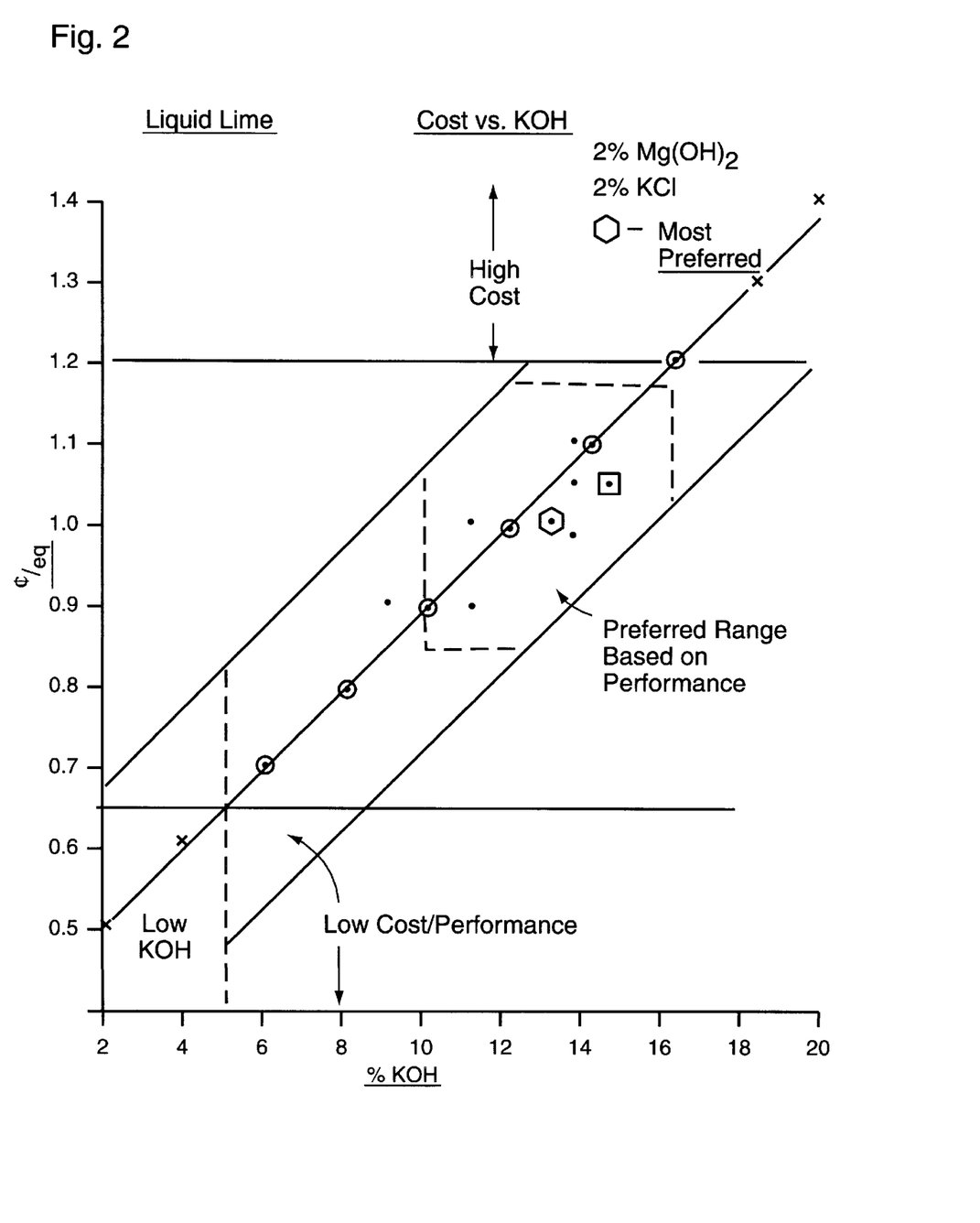
Figure 3:
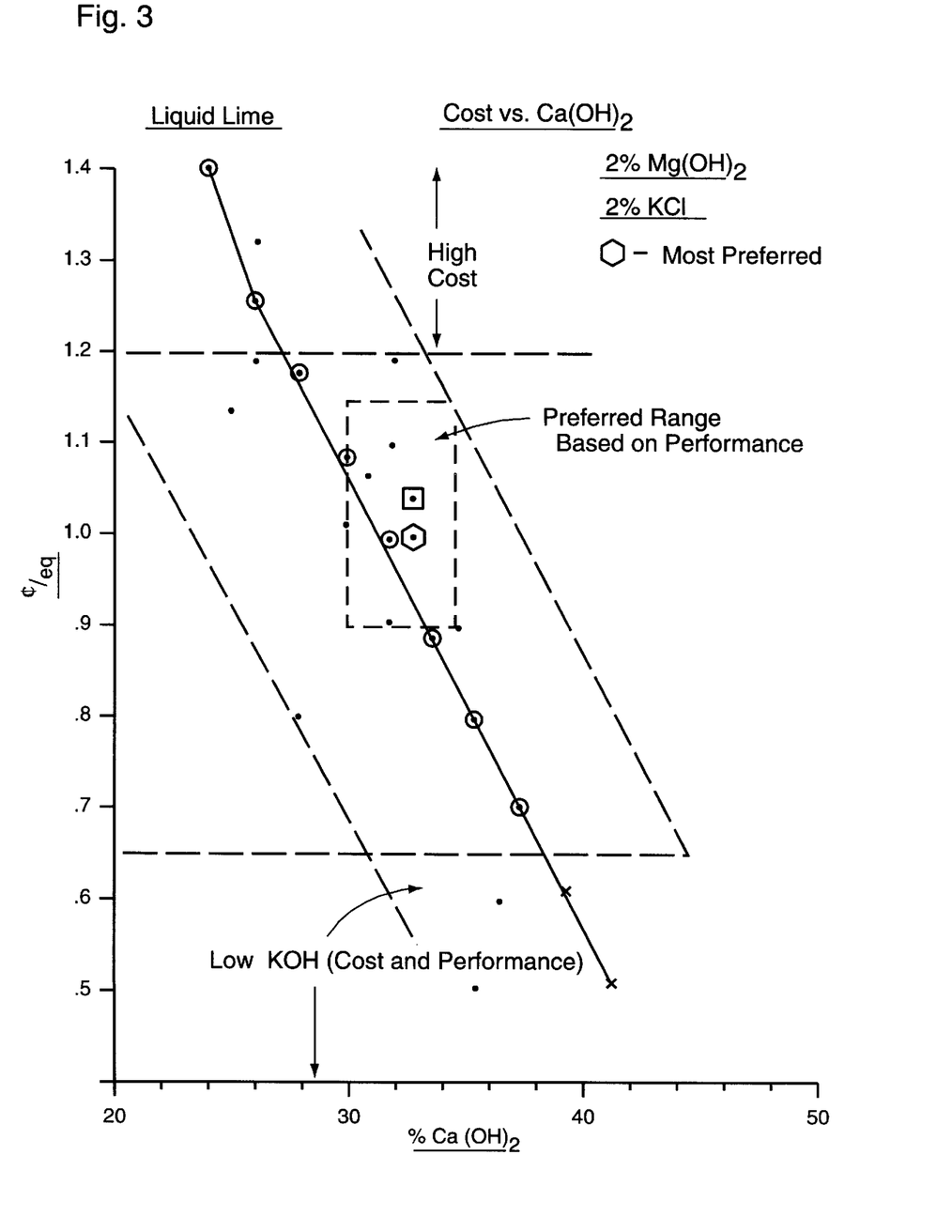

FIGS. 1, 2 and 3 show the cost and performance effects from using various combinations of KOH and Ca(OH)$_2$. FIGS. 2 and 3 show a higher cost for higher levels of KOH in the mix. The reverse is true of Ca(OH)$_2$. A range of 0.7 to 1.2¢/eq is thought to encompass the preferred cost/ performance area. The lower cost level gives way to poor performance.

FIG. 1 summarizes the range of effects, including the amount of water. In general, water usage less than 42–46% is too thick to handle. Samples containing greater than 58% water are too thin, viscosity-wise. A usage of more water is effective if a thickener is used to stabilize the suspension. However, even with a thickener, a level of about 75% water would be about maximum for hauling and storing economically.

Figure 4:
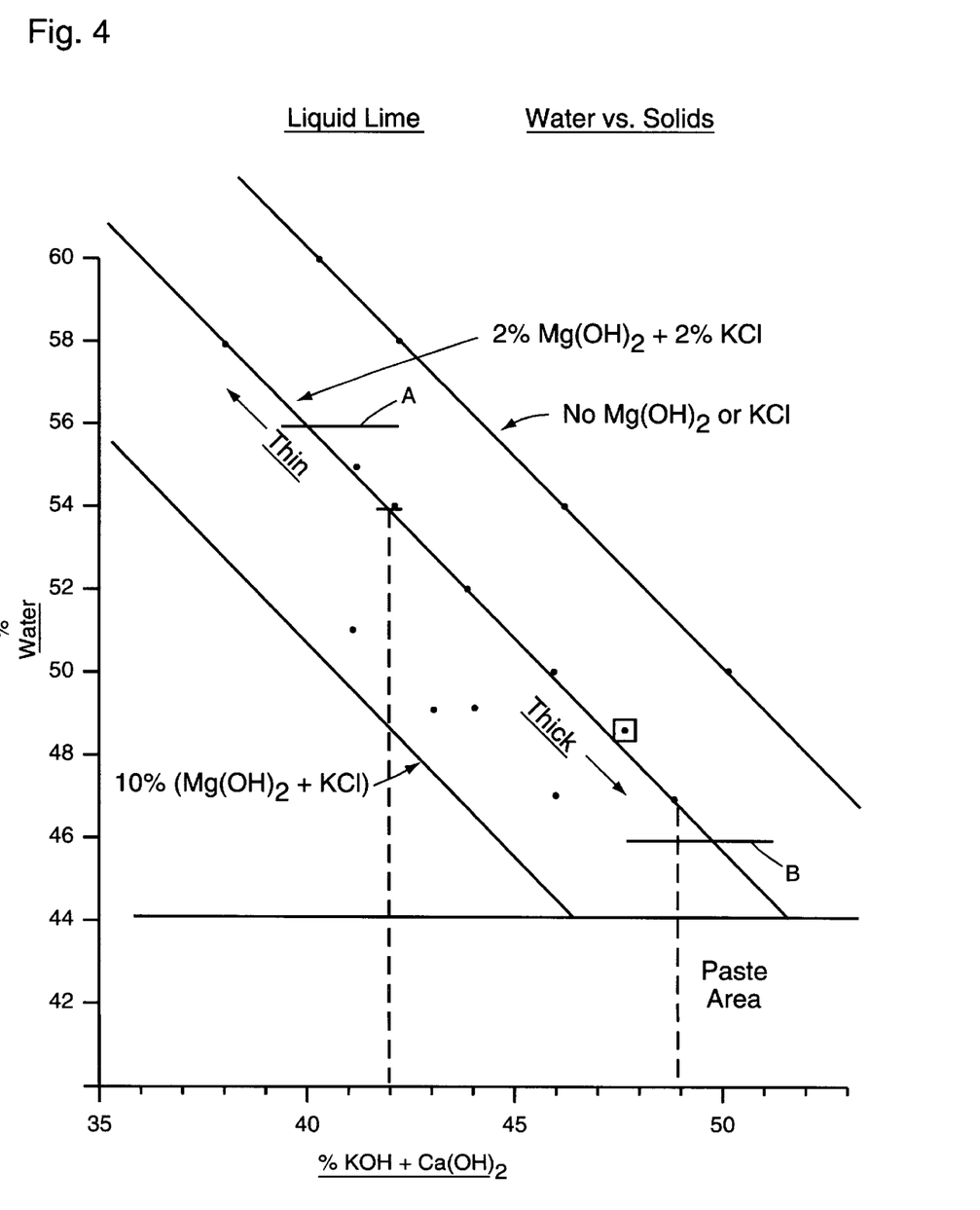
FIG. 4 is a graph illustrating the effects of the relative portions of water and solids.

FIG. 4 also shows the effect of water vs. solids including the extra additives Mg(OH)$_2$ and KCl. The dashed lines depict a range of 47 to 54% water, whereas 46 to 56% water may be the preferred range, it can be extended to 75% if thickener is used. Polyvinyl alcohol or a polyelectrolyte may be used as a thickener to improve suspension.

Figure 5:
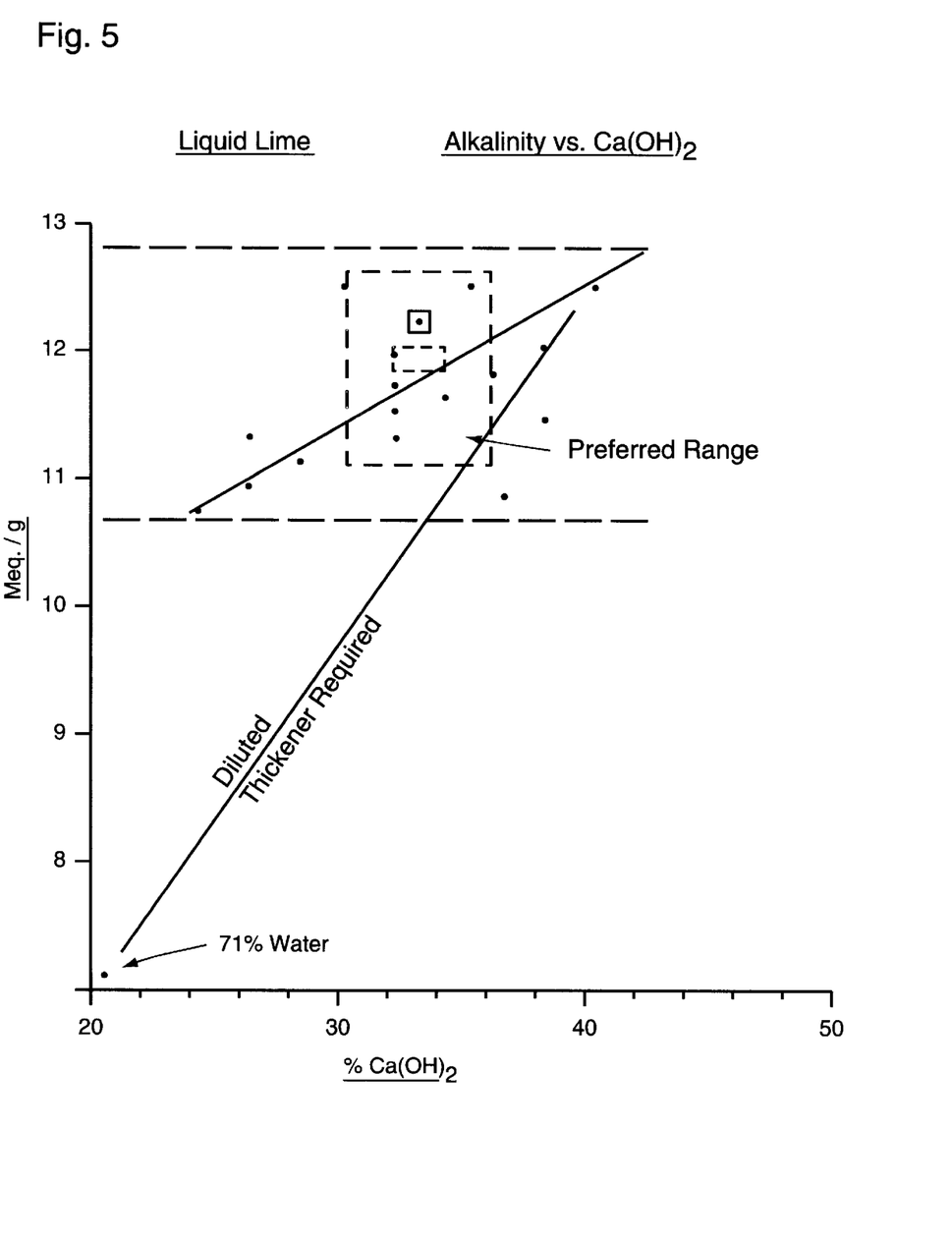
FIG. 5 illustrates the relationship of alkalinity in milliequivalents per gram to the composition percentage of calcium hydroxide.

FIG. 5 shows alkalinity (milliequivalents per gram—meq/ g) versus % Ca(OH)$_2$. In general, alkalinity increases with an increase in Ca(OH)$_2$. However, Mg(OH)$_2$ and water influence this parameter. Most of the samples prepared fall in the range of 10.5 to 12.5 meq/g, but diluted samples may be as low as 7 meq/g.

The range of composition extracted from the graphs is stated above. The preferred range makes good workable products. The broad range encompasses the dilute and the thicker compositions that have marginal handling qualities. As the slurry becomes too dilute with water, some settling occurs during storage and handling.

While certain preferred embodiments of the present invention have been disclosed in detail, it is to be understood that various modifications may be adopted without departing from the spirit of the invention or scope of the following claims.

What is claimed is:

1. A stabilized lime slurry composition for treatment of waste including biosolids, the composition comprising:
   (a) hydrated lime in an amount substantially in the range of 20% to 40% on a dry weight basis;
   (b) potassium hydroxide in an amount substantially in the range of 5% to 18% on a dry weight basis; and
   (c) water in an amount substantially in the range of 42% to 75% by weight.

2. A composition in accordance with claim 1 and further comprising potassium chloride in an amount substantially in the range of 0% to 10% on a dry weight basis.

3. A composition in accordance with claim 2 wherein the potassium chloride is substantially in the range of 2% to 4%.

4. A composition in accordance with claim 2 and further comprising magnesium hydroxide in an amount substantially in the range of 0% to 10% on a dry weight basis.

5. A composition in accordance with claim 4 wherein the magnesium hydroxide is substantially within the range of 2% to 4%.

6. A composition in accordance with claim 5 wherein the potassium chloride is substantially in the range of 2% to 4%.

7. A composition in accordance with claim 2 or 3 or 4 or 5 or 6 wherein the potassium hydroxide is substantially within the range of 10% to 16%.

8. A composition in accordance with claim 4 or 5 or 6 wherein the calcium hydroxide is substantially in the range of 30% to 36%.

9. A composition in accordance with claim 1 or 2 or 3 or 4 or 5 or 6 wherein the water is substantially in the range of 48% to 56% by weight.

10. A composition in accordance with claim 1 or 2 or 3 or 4 or 5 or 6 wherein the ratio of potassium hydroxide to calcium hydroxide is at least substantially 1:8.

11. A composition in accordance with claim 10 wherein the ratio of potassium hydroxide to calcium hydroxide is less than substantially 1:1.

* * * * *